United States Patent
Mori et al.

(10) Patent No.: US 11,976,769 B2
(45) Date of Patent: May 7, 2024

(54) OIL LEAKAGE REPAIRING MATERIAL, OIL LEAKAGE REPAIRING METHOD, AND PIPE

(71) Applicant: DEXERIALS CORPORATION, Tokyo (JP)

(72) Inventors: Yasutaka Mori, Tokyo (JP); Takeshi Nishio, Tokyo (JP); Takaaki Kubota, Tokyo (JP); Tetsuya Abe, Tokyo (JP)

(73) Assignee: Dexerials Corporation, Tokyo (JP)

( * ) Notice: Subject to any disclaimer, the term of this patent is extended or adjusted under 35 U.S.C. 154(b) by 387 days.

(21) Appl. No.: 16/628,774

(22) PCT Filed: Apr. 25, 2019

(86) PCT No.: PCT/JP2019/017554
§ 371 (c)(1),
(2) Date: Jan. 6, 2020

(87) PCT Pub. No.: WO2019/225283
PCT Pub. Date: Nov. 28, 2019

(65) Prior Publication Data
US 2020/0124224 A1    Apr. 23, 2020

(30) Foreign Application Priority Data

May 22, 2018  (JP) ................................. 2018-098009

(51) Int. Cl.
*F16L 55/175*    (2006.01)
*C08F 220/18*    (2006.01)
(Continued)

(52) U.S. Cl.
CPC .......... *F16L 55/175* (2013.01); *C08F 220/18* (2013.01); *C08F 220/28* (2013.01);
(Continued)

(58) Field of Classification Search
CPC .... C08F 220/18; C08F 220/28; C08F 236/02; C08L 25/08; C08L 2312/06; F16L 55/175
See application file for complete search history.

(56) References Cited

U.S. PATENT DOCUMENTS 3,850,651 A * 11/1974 Duncan ................... C04B 28/02
                                                              524/5
3,970,725 A *  7/1976 Tugukuni ............ C08F 283/006
                                                            524/904
(Continued)

FOREIGN PATENT DOCUMENTS

FR       2852601       9/2004
JP       06-166725     6/1994
(Continued)

OTHER PUBLICATIONS

Extended European Search Report issued in corresponding European Application No. 19807030.2, dated Aug. 4, 2021.
(Continued)

*Primary Examiner* — Ling Siu Choi
*Assistant Examiner* — David L Miller
(74) *Attorney, Agent, or Firm* — Carmody Torrance Sandak & Hennessey LLP (57) ABSTRACT

Provided is an oil leakage repairing material, wherein the oil leakage repairing material is a curable composition, oil absorption of the oil leakage repairing material before curing is 100% or greater, and oil absorption of the oil leakage repairing material after curing is 50% or less.

5 Claims, 1 Drawing Sheet (51) Int. Cl.
*C08F 220/28* (2006.01)
*C08F 236/02* (2006.01)
*C08L 25/08* (2006.01)

(52) U.S. Cl.
CPC ............ *C08F 236/02* (2013.01); *C08L 25/08* (2013.01); *C08F 220/1806* (2020.02); *C08F 220/1812* (2020.02); *C08F 220/1818* (2020.02); *C08F 220/281* (2020.02); *C08L 2203/18* (2013.01); *C08L 2312/06* (2013.01)

(56) References Cited

U.S. PATENT DOCUMENTS

| | | | | |
|---|---|---|---|---|
| 4,085,236 | A * | 4/1978 | Ishibashi | G03G 5/0217 524/556 |
| 5,641,832 | A * | 6/1997 | Nagaoka | C08K 9/04 524/754 |
| 5,786,299 | A * | 7/1998 | Lawrence | B41M 5/5245 503/227 |
| 5,844,643 | A * | 12/1998 | Onishi | C09K 19/544 349/94 |
| 5,861,232 | A * | 1/1999 | Kanda | G03F 7/033 430/287.1 |
| 2003/0095770 | A1* | 5/2003 | Fewkes | C03C 25/106 385/128 |
| 2010/0304104 | A1* | 12/2010 | Nagasaki | C09J 153/02 428/494 |
| 2013/0287980 | A1* | 10/2013 | Burdzy | C09J 4/00 156/327 |
| 2013/0309040 | A1 | 11/2013 | Phillips | |
| 2015/0077481 | A1* | 3/2015 | Yoshino | B41J 2/01 106/31.13 |
| 2015/0361313 | A1* | 12/2015 | Xie | C08K 5/101 525/221 |
| 2017/0283664 | A1* | 10/2017 | Kawasaki | C09J 9/00 |

FOREIGN PATENT DOCUMENTS

| | | |
|---|---|---|
| JP | 2000-100627 | 4/2000 |
| JP | 2001-338814 | 12/2001 |
| JP | 2015-086275 | 5/2015 |
| JP | 2017-165949 | 9/2017 |
| JP | 2018-021336 | 2/2018 |

OTHER PUBLICATIONS

Japanese Patent Office, Office Action issued in Japanese Patent Application No. 2018-098009, dated Jul. 4, 2018.
Japanese Patent Office, Office Action issued in Japanese Patent Application No. 2018-207221, dated Nov. 19, 2018.
Japanese Patent Office, Decision of Refusal issued in Japanese Patent Application No. 2018-207221, dated Feb. 19, 2019.
WIPO International Search Report issued in International Patent Application No. PCT/2019/017554 dated Jul. 23, 2019.
WIPO Written Opinion of the International Search Authority, issued in International Patent Application No. PCT/JP2019/017554 dated Jul. 23, 2019.

* cited by examiner

OIL LEAKAGE REPAIRING MATERIAL, OIL LEAKAGE REPAIRING METHOD, AND PIPE

TECHNICAL FIELD

The present invention relates to an oil leakage repairing material suitable for a repair of a pipe when oil is leaked from the pipe through which the oil is passed, an oil leakage repairing method using the oil leakage repairing material, and a pipe repaired with the oil leakage repairing material.

BACKGROUND ART

A transformer equipped with a radiator is installed in, for example, power plants or substations. A main body of the transformer and the radiator are connected with an oil feeding pipe, and the main body of the transformer is cooled by circulating oil (e.g., insulating oil), which has been cooled in the radiator, between the main body of the transformer and the radiator.

As a result of usage of an oil feeding pipe over many years, oil may be leaked from a flange section of the oil feeding pipe. After using an oil feeding pipe for many years, moreover, a hole, such as a pin hole, may be formed in the oil feeding pipe and oil may be leaked from the hole.

When oil is leaked, it is feared that oil penetrates into the ground and may become a remote cause of pollution of soils or water. Particularly, insulating oil of an old-type oil cooler sometimes includes polybiphenyl chloride, which is environmental hormone. Considering possible influence to living bodies and the environment, it is necessary to strictly handle oil leakage.

In order to prevent oil from flowing out when the oil is leaked from a flange section, therefore, proposed is a cover for preventing discharge of oil of a transformer, where an outer circumference of a linked flange is covered with an oil-resistant coating material, and an outlet of cooled oil open at the bottom end of the coating material is connected to a recovery container of the cooled oil (see, for example, PTL 1).

This method however has a problem that oil discharge cannot be prevented when oil is leaked from an area other than a flange section. Moreover, it is necessary to dispose a coating material and a recovery container in this method, and therefore the method lacks convenience.

As a simple discharge prevention measure when oil is leaked from an area other than a flange section, an area from which oil is leaked may be blocked with a rug (cloth). However, this is merely an emergency measure. Once the rug absorbs oil as much as it can, further oil leakage cannot be prevented. Therefore, the discharge prevention measure above lacks reliability.

Therefore, there is currently a need for a method that can easily block oil leakage easily with high reliability when oil is leaked from a pipe through which the oil is passed.

CITATION LIST

Patent Literature

PTL 1: Japanese Patent Application Laid-Open (JP-A) No. 2001-338814

SUMMARY OF INVENTION

Technical Problem

The present invention relates to an oil leakage repairing material that can easily block oil leakage with high reliability when oil is leaked from a pipe through which oil is passed, an oil leakage repairing method using the oil leakage repairing material, and a pipe repaired with the oil leakage repairing material.

Solution to Problem

Means for solving the above-described problems are as follows.

<1> An oil leakage repairing material, wherein:
the oil leakage repairing material is a curable composition;
oil absorption of the oil leakage repairing material before curing is 100% or greater; and
oil absorption of the oil leakage repairing material after curing is 50% or less.

<2> The oil leakage repairing material according to <1>, wherein the oil leakage repairing material is a putty.

<3> The oil leakage repairing material according to <1> or <2>,
wherein the oil leakage repairing material includes an elastomer.

<4> The oil leakage repairing material according to <3>, wherein the elastomer includes styrene as a constitutional component.

<5> The oil leakage repairing material according to <3> or <4>,
wherein an amount of the elastomer is greater than 0% by mass but 35% by mass or less.

<6> The oil leakage repairing material according to any one of <1> to <5>,
wherein the curable composition is an active energy ray-curable composition.

<7> The oil leakage repairing material according to <6>, wherein the oil leakage repairing material includes monofunctional (meth)acrylate free from a hydroxyl group, polyfunctional (meth)acrylate, and a photo-radical initiator.

<8> The oil leakage repairing material according to <7>, wherein an amount of the polyfunctional (meth)acrylate is greater than 0% by mass but 20% by mass or less.

<9> The oil leakage repairing material according to any one of <1> to <8>,
wherein a glass transition temperature of the oil leakage repairing material after curing is 150° C. or lower.

<10> An oil leakage repairing method, including:
applying the oil leakage repairing material according to any one of <1> to <9>, which is an active energy ray-curable composition, to an area of a pipe from which oil is leaked,
and applying active energy rays to the oil leakage repairing material to cure the oil leakage repairing material.

<11> A pipe including:
an area from which oil is leaked; and
a cured product of the oil leakage repairing material according to any one of <1> to <9> on the area from which the oil is leaked.

Advantageous Effects of Invention

The present invention can provide an oil leakage repairing material that can easily block oil leakage with high reliability when oil is leaked from a pipe through which oil is passed, an oil leakage repairing method using the oil leakage repairing material, and a pipe repaired with the oil leakage repairing material.

DESCRIPTION OF EMBODIMENTS

Oil Leakage Repairing Material

The oil leakage repairing material of the present invention is a curable composition.

Oil absorption of the oil leakage repairing material before curing is 100% or greater.

Oil absorption of the oil leakage repairing material after curing is 50% or less.

Since the oil leakage repairing material is a curable composition, the oil leakage repairing material can be easily applied to areas to be repaired, and can easily block oil leakage.

Since the oil absorption of the oil leakage repairing material before curing is 100% or greater, moreover, oil is appropriately absorbed by the oil leakage repairing material when the oil leakage repairing material is applied to an area from which oil is leaked. Therefore, the oil leakage repairing material has excellent adhesion to the oil leakage area. In addition, since the oil absorption of the oil leakage repairing material after curing is 50% or less, oil absorption is low after curing, and the oil leakage repairing material has high sealing capability for oil leakage. Therefore, the oil leakage repairing material can block oil leakage with high reliability.

The oil absorption after curing is not particularly limited and may be appropriately selected depending on the intended purpose, as long as the oil absorption after curing is 50% or less. For example, the oil absorption after curing may be greater than 0% but 50% or less, or 5% or greater but 50% or less.

For example, the oil absorption before curing can be determined by the following method.

The oil leakage repairing material before curing and high pressure insulating oil A available from JXTG Nippon Oil & Energy Corporation (insulating oil A of JIS C2320, type: Type 1) are placed in a glass bottle at a mass ratio of 1:1. The resultant mixture is subjected to planetary agitation (e.g., device: AR-250 available from THINKY CORPORATION, rotational speed: 2,000 rpm, agitation time: 5 minutes). After leaving the resultant for 30 minutes at room temperature (25° C.), whether separation is observed or not is confirmed. When the separation is not observed, oil absorption is determined as 100% or greater. When the separation is observed, oil absorption is determined as less than 100%.

In the case where separation is not observed by the method described above, the state where no separation is observed is not typically changed even when the amount of the oil is further increased in the mass ratio. Specifically, in the measurement above, the fact that the oil absorption before curing is 100% or greater is equivalent to the oil absorption being infinite. In this point of view, it is not necessary to set the upper limit of the oil absorption of the oil leakage repairing material before curing as long as the oil absorption thereof before curing is 100% or greater.

For example, the oil absorption after curing can be determined by the following method.

The oil leakage repairing material is placed in a mold formed of a silicone resin and having a width of 10 mm, a length of 10 mm, and a depth of 5 mm. With the surface of the oil leakage repairing material covered with releasable PET having a thickness of 50 μm, the oil leakage repairing material is irradiated using a metal halide lamp in a manner that an integrated light dose at 365 nm is to be 6 J/cm$^2$, to thereby produce a cured product. A weight of the cured product taken out from the mold is measured, and the result is determined as a weight before oil absorption.

The cured product is placed in a glass bottle. Moreover, a sufficient amount of oil to soak the entire cured product is placed in the glass bottle. After leaving to stand for 24 hours at room temperature (25° C.), a weight of the cured product by which oil is absorbed is measured, and the result is determined as a weight after oil absorption. For example, high pressure insulating oil A available from JXTG Nippon Oil & Energy Corporation (insulating oil A of JIS C2320, type: Type 1) is used as oil.

Then, the oil absorption is determined using the following formula.

$$\text{Oil absorption (\%)}=100\times(\text{weight after oil absorption}-\text{weight before oil absorption})/(\text{weight before oil absorption})$$

Moreover, the oil leakage repairing material is preferably a putty.

In the present invention, for example, the putty has characteristics that a viscosity thereof is 100 Pa·s or greater but 200,000 Pa·s or less, and the putty does not become stringy as the putty is pulled away.

For example, the viscosity can be measured by means of a rheometer. Specifically, a viscosity is measured by means of AR-G2 available from TA Instruments Japan Inc. The measurement is performed at a shear rate of 0.1 s$^{-1}$ in an environment having a temperature of 25° C. using a cone plate having a diameter of 20 mm and an angle of 2°.

Moreover, the characteristics that the oil leakage repairing material does not become stringy as pulled away can be confirmed by whether the oil leakage repairing material becomes stringy when a surface of the oil leakage repairing material is brought into contact with a spatula formed of stainless steel for 0.5 seconds, followed by pulling the oil leakage repairing material away from the spatula.

A glass transition temperature of the oil leakage repairing material after curing is not particularly limited and may be appropriately selected depending on the intended purpose. The glass transition temperature thereof is preferably 150° C. or lower in view of impact resistance, vibration resistance, and repairing performance. The lower limit of the glass transition temperature is not particularly limited and may be appropriately selected depending on the intended purpose. For example, the glass transition temperature may be −40° C. or higher.

For example, the glass transition temperature of the cured product may be determined from a peak value of tan δ (loss tangent) obtained by viscoelasticity measurement. Specifically, temperature dispersion measurement is performed by means of RSAIII available from TA Instruments Japan Inc. with a tensile mode, at frequency of 10 Hz and heating rate of 10° C./min in the range of from −20° C. to 200° C., and the glass transition temperature thereof is determined from a peak value of tan δ (loss tangent). As a measurement sample, used is a strip test piece having a length of 40 mm, a width of 5 mm, and a thickness of 0.5 mm obtained and cured by performing irradiation using a metal halide lamp in a manner that an integrated light dose at 365 nm is to be 6 J/cm$^2$.

The oil leakage repairing material is preferably transparent after curing. Since a state of an area from which oil is leaked can be visually observed after repairing because the oil leakage repairing material is transparent after curing, a change of the oil leakage area can be observed even after repairing.

<Elastomer>

The oil leakage repairing material preferably includes an elastomer.

Since the oil leakage repairing material includes the elastomer, the oil leakage repairing material can be made in the state of a putty. Therefore, the oil leakage repairing material having excellent workability and enhanced convenience is obtained because the oil leakage repairing material can be easily applied to an area to be repaired.

The elastomer is not particularly limited and may be appropriately selected depending on the intended purpose. The elastomer is preferably a styrene-based elastomer.

The elastomer preferably includes an aromatic vinyl compound as a constitutional component, and more preferably includes styrene as a constitutional component. to The styrene-based elastomer is an elastomer which includes an aromatic vinyl compound in a molecule thereof as a constitutional component.

Examples of the styrene-based elastomer include a block copolymer and a random copolymer between a conjugated diene compound and an aromatic vinyl compound, and hydrogenated products thereof.

Examples of the aromatic vinyl compound as the constitutional component in the polymer include constitutional components, such as styrene, p-(tert-butyl)styrene, α-methylstyrene, p-methylstyrene, divinyl benzene, 1,1-diphenylstyrene, N,N-diethyl-p-aminoethylstyrene, and vinyl toluene. Among the above-listed examples, a styrene constitutional component is preferable. The aromatic vinyl compound constitutional components may be used alone or in combination.

Examples of the conjugated diene compound as the constitutional component in the polymer include constitutional components, such as butadiene, isoprene, 1,3-pentadiene, and 2,3-dimethyl-1,3-butadiene. Among the above-listed examples, a butadiene constitutional component is preferable. The above-listed conjugated diene compound constitutional components may be used alone or in combination.

As the styrene-based elastomer, moreover, an elastomer that does not include a styrene component but includes an aromatic vinyl compound other than styrene formed by a similar method may be used.

The styrene-based elastomer preferably includes the styrene constitutional component in an amount of 30% or greater.

Examples of the styrene-based elastomer include a styrene-butadiene-styrene block copolymer (SBS), a styrene-ethylene-butylene-styrene block copolymer (SEBS), a styrene-isoprene-styrene block copolymer (SIS), hydrogenated SBS, a styrene-ethylene-ethylene-propylene-styrene block copolymer (SEEPS), a styrene-ethylene-propylene-styrene block copolymer (SEPS), hydrogenated SIS, hydrogenated styrene·butadiene rubber (HSBR), and hydrogenated acrylonitrile-butadiene rubber (HNBR).

The above-listed examples may be used alone or in combination.

A commercial product can be used for the styrene-based elastomer. For example, SEPTON 4033, 4077, SEPTON 4055, and SEPTON 8105 (all product names, available from KURARAY CO., LTD.), and DYNARON 1320P, DYNARON 4600P, 6200P, 8601P, and 9901P (all product names, JSR Corporation), etc. can be used.

An amount of the elastomer in the oil leakage repairing material is not particularly limited and may be appropriately selected depending on the intended purpose. The amount thereof is preferably greater than 0% by mass but 35% by mass or less, and more preferably 15% by mass or greater but 35% by mass or less.

<Curable Composition>

The curable composition may be a heat-curable composition, an active energy ray-curable composition, or a heat and active energy ray-curable composition. The curable composition is preferably an active energy ray-curable composition because the curable composition is promptly cured and excellent convenience of repairing can be obtained.

<<Active Energy Ray-Curable Composition>>

The active energy ray-curable composition preferably includes monofunctional (meth)acrylate free from a hydroxyl group, polyfunctional (meth)acrylate, and a photoradical initiator.

In the present specification, the term (meth)acrylate means acrylate and methacrylate.

Moreover, the active energy-curable composition that is the oil leakage repairing material preferably includes monofunctional (meth)acrylate including a hydroxyl group in an amount of 50% by mass or less, and is preferably free from monofunctional (meth)acrylate including a hydroxyl group. When the active energy ray-curable composition includes a large amount of the monofunctional (meth)acrylate including a hydroxyl group, the monofunctional (meth)acrylate including a hydroxyl group is not easily compatible to the elastomer, and therefore it is difficult to obtain the oil leakage repairing material including the elastomer.

<<<Monofunctional (Meth)Acrylate Free From Hydroxyl Group>>>

The monofunctional (meth)acrylate free from a hydroxyl group is not particularly limited and may be appropriately selected depending on the intended purpose, as long as the monofunctional (meth)acrylate is monofunctional (meth) acrylate and is free from a hydroxyl group. Examples thereof include aliphatic monofunctional (meth)acrylate, alicyclic monofunctional (meth)acrylate, and aromatic monofunctional (meth)acrylate.

The number of carbon atoms in the monofunctional (meth)acrylate free from a hydroxyl group is not particularly limited and may be appropriately selected depending on the intended purpose. The number of carbon atoms is preferably from 4 to 25, and more preferably from 10 to 30.

The number of carbon atoms in the aliphatic monofunctional (meth)acrylate is not particularly limited and may be appropriately selected depending on the intended purpose. The number of carbon atoms is preferably from 4 to 35, and more preferably from 10 to 30.

Examples of the aliphatic monofunctional (meth)acrylate include methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth)acrylate, isooctyl (meth)acrylate, decyl (meth)acrylate, isodecyl (meth)acrylate, lauryl (meth)acrylate, stearyl (meth)acrylate, and isostearyl (meth)acrylate.

The above-listed examples may be used alone or in combination.

The number of the alicyclic monofunctional (meth)acrylate is not particularly limited and may be appropriately selected depending on the intended purpose. The number of carbon atoms is preferably from 9 to 15.

Examples of the alicyclic monofunctional (meth)acrylate include cyclohexyl (meth)acrylate, isobornyl (meth)acrylate, dicyclopentenyl (meth)acrylate, and tricyclodecanyl (meth)acrylate.

The above-listed examples may be used alone or in combination.

Examples of the aromatic monofunctional (meth)acrylate include benzyl (meth)acrylate, (meth)acrylate of p-cumylphenol alkylene oxide adduct, (meth)acrylate of o-phenylphenol alkylene oxide adduct, (meth)acrylate of phenol alkylene oxide adduct, and (meth)acrylate of nonylphenyl alkylene oxide adduct. Examples of the alkylene oxide include ethylene oxide (EO), and propylene oxide (PO).

The above-listed examples may be used alone or in combination.

An amount of the monofunctional (meth)acrylate free from a hydroxyl group in the active energy-curable composition that is the oil leakage repairing material is not particularly limited and may be appropriately selected depending on the intended purpose. The amount thereof is preferably 30% by mass or greater but 90% by mass or less, more preferably 50% by mass or greater but 85% by mass or less, and particularly preferably 60% by mass or greater but 80% by mass or less.

<<<Polyfunctional (Meth)Acrylate>>>

The polyfunctional (meth)acrylate is not particularly limited and may be appropriately selected depending on the intended purpose, as long as the polyfunctional (meth)acrylate is bifunctional or higher (meth)acrylate. Examples to thereof include bifunctional (meth)acrylate, trifunctional (meth)acrylate, and tetrafunctional (meth)acrylate.

The above-listed examples may be used alone or in combination.

Examples of the bifunctional (meth)acrylate include ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth)acrylate, polypropylene glycol di(meth)acrylate, butylene glycol di(meth)acrylate, neopentyl glycol di(meth)acrylate, ethylene oxide-modified bisphenol A di(meth)acrylate, propylene oxide-modified bisphenol A di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, diglycidyl phthalate di(meth)acrylate, and hydroxypivalic acid-modified neopentyl glycol di(meth)acrylate.

The above-listed examples may be used alone or in combination.

Examples of the trifunctional (meth)acrylate include trimethylol propane tri(meth)acrylate, pentaerythritol tri(meth)acrylate, and tri(meth)acryloyloxyethoxytrimethylol propane.

The above-listed examples may be used alone or in combination.

Examples of the tetra(meth)acrylate include pentaerythritol tetra(meth)acrylate.

The above-listed examples may be used alone or in combination.

Examples of pentafunctional or higher (meth)acrylate include dipentaerythritol penta(meth)acrylate, and dipentaerythritol hexa(meth)acrylate.

The above-listed examples may be used alone or in combination.

An amount of the polyfunctional (meth)acrylate in the active energy-curable composition that is the oil leakage repairing material is not particularly limited and may be appropriately selected depending on the intended purpose. The amount thereof is preferably greater than 0% by mass but 20% by mass or less, more preferably 0.1% by mass or greater but 15% by mass or less, and particularly preferably 0.2% by mass or greater but 10% by mass or less.

<<<Photo-Radical Initiator>>>

Examples of the photo-radical initiator include benzophenones, benzyl ketals, dialkoxyacetophenones, hydroxyalkylacetophenones, aminoalkylphenones, and acylphosphine oxides. Specific examples thereof include benzophenone, methyl benzophenone, 4-phenylbenzophenone, 4,4'-bis(dimethylamino)benzophenone, 4,4'-bis(diethylamino)benzophenone, benzyl, 2,2-dimethoxy-2-phenylacetophenone, dimethoxyacetophenone, diethoxyacetophenone, 2-hydroxy-2-methyl-1-phenylpropan-1-one, 2-benzyl-2-dimethylamino-1-(4-morpholinophenyl)-butan-1-one, 2-methyl-1-[4-(methoxythio)-phenyl]-2-morpholinopropan-2-one, 1-hydroxy-cyclohexyl-phenylketone, diphenylacylphenylphosphine oxide, diphenyl(2,4,6-trimethylbenzoyl)phosphine oxide, 2,4,6-trimethylbenzoylethoxyphenylphosphine oxide, and bis(2,4,6-trimethyl-benzoyl)phenylphosphine oxide.

The above-listed examples may be used alone or in combination.

An amount of the photo-radical initiator in the active energy-curable composition that is the oil leakage repairing material is not particularly limited and may be appropriately selected depending on the intended purpose. The amount thereof is preferably 0.1% by mass or greater but 20% by mass or less, more preferably 0.5% by mass or greater but 10% by mass or less, and particularly preferably 1% by mass or greater but 5% by mass or less.

A method for curing the curable composition is not particularly limited and may be appropriately selected depending on the intended purpose. Preferred is a method where the curable composition is an active energy ray-curable composition, and active energy rays are applied to the active energy ray-curable composition to cure the active energy ray-curable composition. The active energy rays are not particularly limited and may be appropriately selected depending on the intended purpose. Examples thereof include electron beams, ultraviolet rays, infrared rays, laser light, visible light, ionizing radiation (e.g., X rays, α rays, β rays, and γ rays), microwaves, and high frequency waves.

Oil Leakage Repairing Method

The oil leakage repairing method of the present invention includes at least a curing step, and may further include other steps according to the necessity.

<Curing Step>

The curing step is not particularly limited and may be appropriately selected depending on the intended purpose, as long as the curing step is a step including applying the oil leakage repairing material of the present invention, which is an active energy ray-curable composition, to an area of a pipe from which oil is leaked, and applying active energy rays to the oil leakage repairing material to cure the oil leakage repairing material.

The pipe is not particularly limited and may be appropriately selected depending on the intended purpose, as long as the pipe is a pipe configured to feed insulating oil between a radiator and a transformer.

A material of the pipe is not particularly limited and may be appropriately selected depending on the intended purpose, as long as the material thereof is metal. Examples of the pipe include a pipe formed of stainless steel.

A size and length of the pipe are not particularly limited and may be appropriately selected depending on the intended purpose.

Note that, a surface of the pipe may be treated with anticorrosion coating etc. as long as such coating does not adversely affect functions of the present invention.

The area of the pipe from which oil is leaked is not particularly limited and may be appropriately selected depending on the intended purpose. Examples of the area thereof include a hole (e.g., a pin hole) formed in the pipe, and a joint section (e.g., a flange section) of the pipe.

A method for applying the oil leakage repairing material to the area from which oil is leaked is not particularly limited and may be appropriately selected depending on the intended purpose. Examples thereof include brush coating, spatula coating, roller coating, and spray coating.

The active energy rays are not particularly limited and may be appropriately selected depending on the intended purpose. Examples thereof include electron beams, ultraviolet rays, infrared rays, laser light, visible light, ionizing radiation (e.g., X rays, $\alpha$ rays, $\beta$ rays, and $\gamma$ rays), microwaves, and high frequency waves.

The radiation dose of the active energy rays to the oil leakage repairing material is not particularly limited and may be appropriately selected depending on the intended purpose.

Pipe

The pipe of the present invention is a pipe including an area from which oil is leaked, and includes a cured product of the oil leakage repairing material of the present invention on the area from which oil is leaked.

The pipe is not particularly limited and may be appropriately selected depending on the intended purpose, as long as the pipe is a pipe configured to feed insulating oil between a radiator and a transformer.

A material of the pipe is not particularly limited and may be appropriately selected depending on the intended purpose, as long as the material thereof is metal. Examples of the pipe include a pipe formed of stainless steel.

A size and length of the pipe are not particularly limited and may be appropriately selected depending on the intended purpose.

Note that, a surface of the pipe may be treated with anticorrosion coating etc. as long as such coating does not adversely affect functions of the present invention.

The area of the pipe from which oil is leaked is not particularly limited and may be appropriately selected depending on the intended purpose. Examples of the area thereof include a hole (e.g., a pin hole) formed in the pipe, and a joint section (e.g., a flange section) of the pipe.

A curing method of the oil leakage repairing material is not particularly limited and may be appropriately selected depending on the intended purpose. Examples thereof include the curing step of the oil leakage repairing method of the present invention.

EXAMPLES

Examples of the present invention will be described hereinafter but the present invention is not limited to Examples below in any way.

Example 1

<Production of Oil Leakage Repairing Material>

Among the components presented in Table 1-1, the components (A), (B), (C), and (D) were mixed at a blending ratio presented in Table 1-1. To the obtained mixture, the component (E) was added at the blending ratio presented in Table 1-1. The resultant mixture was subjected to planetary agitation at the rotational speed of 2,000 rpm by means of a planetary centrifugal mixer (AR-250, available from THINKY CORPORATION) until undissolved substances disappeared. In the manner as described above, an active energy ray-curable composition that was an oil leakage repairing material was produced.

Examples 2 to 13 and Comparative Examples 1 to 2

An active energy ray-curable composition that was an oil leakage repairing material was produced in the manner as in Example 1, except that the composition was changed to a composition of each of Examples 2 to 13 and Comparative Examples 1 to 2 presented in Tables 1-1 to 1-3.

[Measurement and Evaluations]

The obtained active energy ray-curable compositions were subjected to measurement and evaluations below. The results are presented in Tables 1-1 to 1-3.

<Measurement of Viscosity>

Viscosity was measured by means of a rheometer. Specifically, the viscosity was measured by means of AR-G2 available from TA Instruments Japan Inc. The measurement was performed at a shear rate of 0.1 s$^{-1}$ in an environment having a temperature of 25° C. using a cone plate having a diameter of 20 mm and an angle of 2°.

<Stringiness>

After bringing a surface of the oil leakage repairing material into contact with a spatula formed of stainless steel for 0.5 seconds, the oil leakage repairing material was pulled away from the spatula. At this time, whether the oil leakage repairing material became stringy or not was visually confirmed and the result was evaluated based on the following evaluation criteria.

[Evaluation Criteria]

Desirable: Did not become stringy.

Undesirable: Became stringy.

<Compatibility to Oil (Oil Absorption Before Curing)>

The oil leakage repairing material before curing and high pressure insulating oil A available from JXTG Nippon Oil & Energy Corporation (insulating oil A of JIS C2320, type: Type 1) were placed in a glass bottle at a mass ratio of 1:1. The resultant mixture was subjected to planetary agitation (device: AR-250 available from THINKY CORPORATION, rotational speed: 2,000 rpm, agitation time: 5 minutes). After leaving the resultant for 30 minutes at room temperature (25° C.), whether separation was observed or not was confirmed. When the separation was not observed, oil absorption was determined as 100% or greater. When the separation was observed, oil absorption was determined as less than 100%.

<Evaluation Method of Oil Absorption (Oil Absorption After Curing)>

The oil leakage repairing material was placed in a mold formed of a silicone resin and having a width of 10 mm, a length of 10 mm, and a depth of 5 mm. With the surface of the oil leakage repairing material covered with releasable PET having a thickness of 50 μm, the oil leakage repairing material was irradiated using a metal halide lamp in a manner that an integrated light dose at 365 nm was to be 6 J/cm$^2$, to thereby produce a cured product. A weight of the cured product taken out from the mold was measured, and the result was determined as a weight before oil absorption.

The cured product was placed in a glass bottle. Moreover, a sufficient amount of insulating oil to soak the entire cured product was placed in the glass bottle. After leaving to stand for 24 hours at room temperature (25° C.), a weight of the cured product by which insulating oil was absorbed was measured, and the result was determined as a weight after oil absorption. For example, high pressure insulating oil A available from JXTG Nippon Oil & Energy Corporation (insulating oil A of JIS C2320, type: Type 1) was used as insulating oil.

Then, the oil absorption was determined using the following formula.

Oil absorption (%)=100×(weight after oil absorption−weight before oil absorption)/(weight before oil absorption)

<Glass Transition Temperature of Cured Product>

A glass transition temperature of a cured product was determined from a peak value of tan δ (loss tangent) obtained by viscoelasticity measurement. Specifically, temperature dispersion measurement was performed by means of RSAIII available from TA Instruments Japan Inc. with a tensile mode, at frequency of 10 Hz and heating rate of 10° C./min in the range of from −20° C. to 200° C., and the glass transition temperature thereof was determined from a peak value of tan δ (loss tangent). As a measurement sample, used was a strip test piece having a length of 40 mm, a width of 5 mm, and a thickness of 0.5 mm obtained and cured by performing irradiation using a metal halide lamp in a manner that an integrated light dose at 365 nm was to be 6 J/cm$^2$.

<Transparency Evaluation Method>

Total light transmittance of the oil leakage repairing material after curing was measured by means of a haze meter (HM-150, manufactured by MURAKAMI COLOR RESEARCH LABORATORY) according to JIS K 7136.

A measurement sample was produced by nipping the oil leakage repairing material with 2 sheets of S9213 available from Matsunami Glass Ind., Ltd. in a manner that a resultant was to have a side of 25 mm or greater and a thickness of 1 mm. Thereafter, the resultant was irradiated by means of a metal halide lamp in a manner that an integrated light dose at 365 nm was to be 6 J/cm$^2$ to cure.

When the transparency was 50% or greater, the sample was determined as transparent.

<Evaluation Method of Adhesion>

A circular mold formed of a silicone resin and having a diameter of 6 mm and a thickness of 2 mm was placed on a plate of SUS304. The mold was filled with the oil leakage repairing material including high pressure insulating oil A available from JXTG Nippon Oil & Energy Corporation (insulating oil A of JIS C2320, type: Type 1) in an amount of 10% by mass. The oil leakage repairing material was cured by irradiating using a metal halide lamp in a manner that an integrated light dose at 365 nm was to be 6 J/cm$^2$. Thereafter, the cured product was taken out from the silicone resin mold to thereby produce a test piece (diameter: 6 mm, thickness: 2 mm) applied to the SUS304.

An adhesion test was performed according to JIS K 5600-5-7: mechanical characteristics of a coating film-Section 7: adhesion (pull off method). For adhesion between the test piece and a test cylinder, Aronalpha 201 available from TOAGOSEI CO., LTD. and an accelerator were used to completely cure and adhere. Measurement of adhesion was performed at a tensile speed of 10 mm/min by means of a desktop precision universal tester Autograph AGS-X available from Shimadzu Corporation.

<Oil Leakage Sealing Test>

Figure 1:
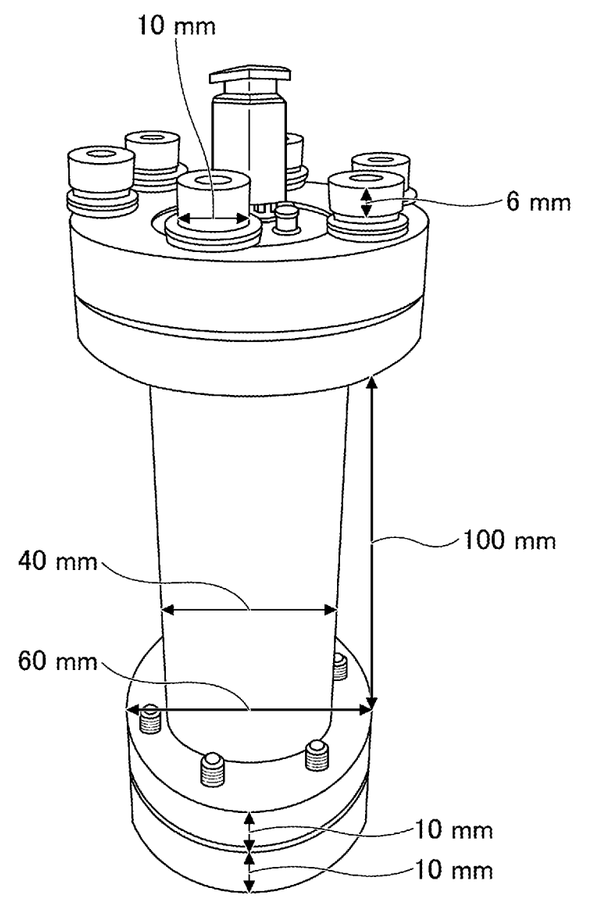
FIG. 1 is a photograph depicting a pressure vessel used for an oil leakage sealing test.

A stainless steel wire having a diameter of 0.5 mm was nipped with inner seals of the flange section of the pressure vessel illustrated in FIG. 1 to produce a test device which leaked about 0.1 cc of oil for 1 minute as pressure was applied by air of 0.2 MPa. An oil leakage sealing test was performed using the test device as prepared.

High pressure insulating oil A available from JXTG Nippon Oil & Energy Corporation (insulating oil A of JIS C2320, type: Type 1) was used as oil.

To the area from which oil was leaked at the above-mentioned rate, 20 g of the oil leakage repairing material was applied to sufficiently cover the area. The oil leakage repairing material was irradiated by a metal halide lamp in a manner that an integrated light dose at 365 nm was to be 6 J/cm$^2$, to thereby cure the oil leakage repairing material. One hour later, the state of oil leakage was visually observed, and is the result was evaluated based on the following evaluation criteria.

[Evaluation Criteria]
Desirable: Oil leakage did not occur.
Undesirable: Oil leakage occurred.

TABLE 1-1

| Oil leakage repairing material | | Ex. 1 | | Ex. 2 | | Ex. 3 | | Ex. 4 | | Ex. 5 | |
|---|---|---|---|---|---|---|---|---|---|---|---|
| | | mass parts | mass % | mass parts | mass % | mass parts | mass % | mass parts | mass % | mass parts | mass % |
| Component (A): Monofunctional acryl free from OH | 2EHA | 70 | 65.42 | | | | | | | | |
| | SA | | | 70 | 65.42 | | | | | | |
| | SMA | | | | | 70 | 65.42 | | | | |
| | LA | | | | | | | 70 | 65.42 | | |
| | ISTA | | | | | | | | | 70 | 65.42 |
| | IBXA | | | | | | | | | | |
| Component (B): Polyfunctional (bifunctional) acryl | A-DCP | 5 | 4.67 | 5 | 4.67 | 5 | 4.67 | 5 | 4.67 | 5 | 4.67 |
| Component (C): Monofunctioinal acryl including OH | 4HBA | | | | | | | | | | |

TABLE 1-1-continued

| Oil leakage repairing material | | Ex. 1 | | Ex. 2 | | Ex. 3 | | Ex. 4 | | Ex. 5 | |
|---|---|---|---|---|---|---|---|---|---|---|---|
| | | mass parts | mass % | mass parts | mass % | mass parts | mass % | mass parts | mass % | mass parts | mass % |
| Component (D): Photo-radical initiator | IRG 1173 | 2 | 1.87 | 2 | 1.87 | 2 | 1.87 | 2 | 1.87 | 2 | 1.87 |
| Component (E): elastomer | SBS | | | | | | | | | | |
| | SEBS | | | | | | | | | | |
| | SIS | | | | | | | | | | |
| | SEEPS | 30 | 28.04 | 30 | 28.04 | 30 | 28.04 | 30 | 28.04 | 30 | 28.04 |
| Total | | 107 | 100 | 107 | 100 | 107 | 100 | 107 | 100 | 107 | 100 |
| Viscosity before curing (Pa · s) | | 2,100 | | 1,500 | | 1,500 | | 500 | | 23,000 | |
| Stringiness | | none | | none | | none | | none | | none | |
| External appearance before curing | | transparent | | transparent | | transparent | | transparent | | transparent | |
| Oil absorption before curing | | 100% or greater | | 100% or greater | | 100% or greater | | 100% or greater | | 100% or greater | |
| Oil absorption after curing (%) | | 23 | | 45 | | 40 | | 33 | | 28 | |
| Glass transition temperature of cured product | | −35 | | 30 | | 38 | | 0 | | 12 | |
| Total light transmittance (%) | | 85 | | 88 | | 60 | | 85 | | 85 | |
| Adhesion (MPa) | | 0.2 | | >0.5 | | >0.5 | | >0.5 | | >0.5 | |
| Oil leakage sealing test | | desirable | | desirable | | desirable | | desirable | | desirable | |

TABLE 1-2

| Oil leakage repairing material | | Ex. 6 | | Ex. 7 | | Ex. 8 | | Ex. 9 | | Ex. 10 | |
|---|---|---|---|---|---|---|---|---|---|---|---|
| | | mass parts | mass % | mass parts | mass % | mass parts | mass % | mass parts | mass % | mass parts | mass % |
| Component (A): Monofunctional acryl free from OH | 2EHA | | | | | | | | | | |
| | SA | | | | | | | | | | |
| | SMA | | | | | | | | | | |
| | LA | | | | | | | | | | |
| | ISTA | 80 | 74.77 | 65 | 60.75 | 70 | 68.29 | 70 | 62.50 | 70 | 65.42 |
| | IBXA | | | | | | | | | | |
| Component (B): Polyfunctional (bifunctional) acryl | A-DCP | 5 | 4.67 | 5 | 4.67 | 0.5 | 0.49 | 10 | 8.93 | 5 | 4.67 |
| Component (C): Monofunctioinal acryl including OH | 4HBA | | | | | | | | | | |
| Component (D): Photo-radical initiator | IRG 1173 | 2 | 1.87 | 2 | 1.87 | 2 | 1.95 | 2 | 1.79 | 2 | 1.87 |
| Component (E): elastomer | SBS | | | | | | | | | 30 | 28.04 |
| | SEBS | | | | | | | | | | |
| | SIS | | | | | | | | | | |
| | SEEPS | 20 | 18.69 | 35 | 32.71 | 30 | 29.27 | 30 | 26.79 | | |
| Total | | 107 | 100 | 107 | 100 | 102.5 | 100 | 112 | 100 | 107 | 100 |
| Viscosity before curing (Pa · s) | | 300 | | 100,000 | | 25,000 | | 20,000 | | 8,000 | |
| Stringiness | | none | | none | | none | | none | | none | |
| External appearance before curing | | transparent | | transparent | | transparent | | transparent | | transparent | |
| Oil absorption before curing | | 100% or greater | | 100% or greater | | 100% or greater | | 100% or greater | | 100% or greater | |
| Oil absorption after curing (%) | | 23 | | 45 | | 40 | | 35 | | 20 | |
| Glass transition temperature of cured product | | 13 | | 11 | | 12 | | 12 | | 12 | |

TABLE 1-2-continued

| Oil leakage repairing material | Ex. 6 mass parts | Ex. 6 mass % | Ex. 7 mass parts | Ex. 7 mass % | Ex. 8 mass parts | Ex. 8 mass % | Ex. 9 mass parts | Ex. 9 mass % | Ex. 10 mass parts | Ex. 10 mass % |
|---|---|---|---|---|---|---|---|---|---|---|
| Total light transmittance (%) | 85 | | 85 | | 85 | | 85 | | 85 | |
| Adhesion (MPa) | >0.5 | | >0.5 | | >0.5 | | >0.5 | | >0.5 | |
| Oil leakage sealing test | desirable | | desirable | | desirable | | desirable | | desirable | |

TABLE 1-3

| Oil leakage repairing material | | Ex. 11 mass parts | Ex. 11 mass % | Ex. 12 mass parts | Ex. 12 mass % | Ex. 13 mass parts | Ex. 13 mass % | Comp. Ex. 1 mass parts | Comp. Ex. 1 mass % | Comp. Ex. 2 mass parts | Comp. Ex. 2 mass % |
|---|---|---|---|---|---|---|---|---|---|---|---|
| Component (A): Monofunctional acryl free from OH | 2EHA | | | | | | | | | | |
| | SA | | | | | | | | | | |
| | SMA | | | | | | | | | | |
| | LA | | | | | | | | | | |
| | ISTA | 70 | 65.42 | 70 | 65.42 | | | 70 | 68.63 | | |
| | IBXA | | | | | 70 | 65.42 | | | | |
| Component (B): Polyfunctional (bifunctional) acryl | A-DCP | 5 | 4.67 | 5 | 4.67 | 5 | 4.67 | 0 | 0.00 | 5 | 4.67 |
| Component (C): Monofunctioinal acryl including OH | 4HBA | | | | | | | | | 70 | 65.42 |
| Component (D): Photo-radical initiator | IRG 1173 | 2 | 1.87 | 2 | 1.87 | 2 | 1.87 | 2 | 1.96 | 2 | 1.87 |
| Component (E): elastomer | SBS | | | | | | | | | | |
| | SEBS | 30 | 28.04 | | | | | | | | |
| | SIS | | | 30 | 28.04 | | | | | | |
| | SEEPS | | | | | 30 | 28.04 | 30 | 29.41 | 30 | 28.04 |
| Total | | 107 | 100 | 107 | 100 | 107 | 100 | 102 | 100 | 107 | 100 |
| Viscosity before curing (Pa · s) | | 2,000 | | 10,000 | | 9,000 | | 23,000 | | NA | |
| Stringiness | | none | | none | | none | | none | | NA | |
| External appearance before curing | | transparent | | transparent | | transparent | | transparent | | NA | |
| Oil absorption before curing | | 100% or greater | | 100% or greater | | 100% or greater | | 100% or greater | | NA | |
| Oil absorption after curing (%) | | 23 | | 35 | | 22 | | 100 | | NA | |
| Glass transition temperature of cured product | | 12 | | 12 | | 133 | | 12 | | NA | |
| Total light transmittance (%) | | 85 | | 85 | | 85 | | 85 | | NA | |
| Adhesion (MPa) | | >0.5 | | >0.5 | | 0.2 | | >0.5 | | NA | |
| Oil leakage sealing test | | desirable | | desirable | | desirable | | undesirable | | NA | |

In Tables 1-1 to 1-3, ">0.5" in the column of the adhesion means that the adhesion is greater than 0.5 MPa. Note that, in the sample having the evaluation result of ">0.5," no peeling between the plate of SUS304 and the oil leakage repairing material was observed, and peeling between the jig and the adhesive, the adhesion of which was 0.5 MPa, was observed.

The external appearance before curing was visually evaluated.

The details of the materials used in Examples and Comparative Examples are as follows.

2EHA: 2-ethylhexyl acrylate (available from NIPPON SHOKUBAI CO., LTD.)
SA: stearyl acrylate (available from KYOEISHA CHEMICAL Co., Ltd.)
SMA: stearyl methacrylate (available from KYOEISHA CHEMICAL Co., Ltd.)
LA: lauryl acrylate (available from KYOEISHA CHEMICAL Co., Ltd.)
ISTA: isostearyl acrylate (available from OSAKA ORGANIC CHEMICAL INDUSTRY LTD.)
IBXA: isobornyl acrylate (available from OSAKA ORGANIC CHEMICAL INDUSTRY LTD.)
A-DCP: tricyclodecane dimethanol diacrylate (available from SHIN-NAKAMURA CHEMICAL CO., LTD.)
4HBA: 4-hydroxybutyl acrylate (available from OSAKA ORGANIC CHEMICAL INDUSTRY LTD.)
IRG 1173: 2-hydroxy-2-methyl-1-phenylpropan-1-one (available from BASF)
SBS: JSR TR2250 (available from JSR Corporation)

SEBS: SEPTON8006 (available from KURARAY CO., LTD.)

SIS: JSR SIS5250 (available from JSR Corporation)

SEEPS: SEPTON4033 (available from KURARAY CO., LTD.)

With the composition of Comparative Example 2, the elastomer and the monofunctional acryl including OH did not mix and therefore a repairing material could not be prepared.

When the elastomer was not added, moreover, a putty that was transparent and could be photocured could not be obtained. When the elastomer was added, on the other hand, the oil absorption before curing was 100% or greater. Therefore, a putty that had oil absorption of less than 100% before curing and could be photocured could not be prepared.

The oil leakage repairing materials of Examples 1 to 13 had oil absorption of 100% or greater before curing, and oil absorption of 50% or less after curing. Therefore, the excellent results were obtained in the oil leakage sealing test, and it was confirmed that oil leakage was easily blocked with high reliability.

Since the oil leakage repairing material of Comparative Example 1 did not include polyfunctional (meth)acrylate, oil absorption after curing was greater than 50% and oil leakage was confirmed in the oil leakage sealing test.

INDUSTRIAL APPLICABILITY

The oil leakage repairing material of the present invention can be suitably used for a repair of oil leakage of a pipe because the oil leakage repairing material can easily block oil leakage with high reliability when oil is leaked from a pipe through which the oil is passed.

The invention claimed is:

1. An oil leakage repairing material comprising:
an elastomer, monofunctional (meth)acrylate free from a hydroxyl group, polyfunctional (meth)acrylate, and a photo-radical initiator;
wherein the oil leakage repairing material is a putty;
wherein the elastomer includes styrene as a constitutional component;
wherein an amount of the elastomer in the total amount of the oil leakage repairing material is greater than 15% by mass but 35% by mass or less;
wherein an amount of the monofunctional (meth)acrylate free from a hydroxyl group in the total amount of the oil leakage repairing material is greater than 60% by mass but 80% by mass or less;
wherein the oil leakage repairing material is an active energy ray-curable composition;
oil absorption of the oil leakage repairing material before curing is 100% by weight or greater; and
oil absorption of the oil leakage repairing material after curing is 50% by weight or less.

2. The oil leakage repairing material according to claim 1, wherein an amount of the polyfunctional (meth)acrylate in the total amount of the oil leakage repairing material is greater than 0.1% by mass but 15% by mass or less.

3. The oil leakage repairing material according to claim 2, wherein the amount of the polyfunctional (meth)acrylate in the total amount of the oil leakage repairing material is greater than 0.2% by mass but 10% by mass or less.

4. The oil leakage repairing material according to claim 1, wherein a glass transition temperature of the oil leakage repairing material after curing is 150° C. or lower.

5. An oil leakage repairing method, comprising:
applying the oil leakage repairing material according to claim 1, which is an active energy ray-curable composition, to an area of a pipe from which oil is leaked, and applying active energy rays to the oil leakage repairing material to cure the oil leakage repairing material.

* * * * *